United States Patent [19]

Garner

[11] Patent Number: 5,428,770
[45] Date of Patent: Jun. 27, 1995

[54] SINGLE-CHIP MICROCONTROLLER WITH EFFICIENT PERIPHERAL TESTABILITY

[75] Inventor: Robert E. Garner, Austin, Tex.

[73] Assignee: Motorola, Inc., Schaumburg, Ill.

[21] Appl. No.: 114,597

[22] Filed: Aug. 31, 1993

[51] Int. Cl.[6] .............................................. G06F 11/30
[52] U.S. Cl. .................................. 395/575; 371/16.1; 371/22.5
[58] Field of Search .............. 395/575; 371/22.5, 16.1, 371/16.2, 22.4

[56] References Cited

U.S. PATENT DOCUMENTS

| | | | |
|---|---|---|---|
| 4,433,413 | 2/1984 | Fasang | 371/22.4 |
| 4,597,080 | 6/1986 | Thatte | 371/25 |
| 4,674,089 | 6/1987 | Poret et al. | 371/25 |
| 4,691,316 | 9/1987 | Phillips | 371/20 |
| 4,788,683 | 11/1988 | Hester | 371/16.1 |
| 4,878,168 | 10/1989 | Johnson et al. | 371/16.2 |
| 4,929,889 | 5/1990 | Seiler et al. | 371/22.3 |
| 4,979,172 | 12/1990 | Murase et al. | 371/16.1 |
| 5,001,713 | 3/1991 | Whetsel | 371/22.3 |
| 5,040,178 | 8/1991 | Lindsay | 371/21.5 |
| 5,048,019 | 9/1991 | Albertsen | 371/21.1 |
| 5,054,024 | 10/1991 | Whetsel | 371/22.3 |
| 5,136,590 | 8/1992 | Polstra | 371/16.2 |
| 5,173,904 | 12/1992 | Daniels et al. | 371/22.3 |
| 5,185,882 | 2/1993 | White, Jr. et al. | 395/575 |
| 5,193,195 | 3/1993 | Miyazaki | 395/725 |
| 5,291,425 | 3/1994 | Nagaishi | 364/570 |

OTHER PUBLICATIONS

Motorola, Inc.; "DSP96002 IEEE Floating-Point Dual-Port Processor User's Manual"; Section 10, pp. 10.1–.22 (1989).

Motorola, Inc.; "MC68302 Integrated Multiprotocol Processor User's Manual"; Section 1; pp. 1.1–.9 (1989).

Primary Examiner—Jack B. Harvey
Assistant Examiner—Paul R. Myers
Attorney, Agent, or Firm—Paul J. Polansky

[57] ABSTRACT

A single-chip microcontroller (30) includes a central processing unit (CPU) (31) and several memory-mapped peripherals (32, 33, 34, 35) connected to internal address (37) and data (38) buses. The microcontroller (30) includes a test port (40) for receiving test data and providing the test data to the address (37) and data (38) buses to access the memory-mapped peripherals (32, 33, 34, 35) directly. The microcontroller (30) thus allows testing of the memory-mapped peripherals (32, 33, 34, 35) without CPU overhead, significantly reducing test time. The test port (40) includes a shift register (44) which selectively updates address high, address low, and data fields using the test data so that a field need not be re-entered if it doesn't change between test cycles. The test port (40) receives the test data and test control signals via signal lines shared with a general purpose input/output (GPIO) port (33) and requires only one independent control signal line.

13 Claims, 5 Drawing Sheets

SINGLE-CHIP MICROCONTROLLER WITH EFFICIENT PERIPHERAL TESTABILITY

FIELD OF THE INVENTION

This invention relates generally to data processors, and more particularly, to single-chip microcontrollers.

BACKGROUND OF THE INVENTION

Presently, microcontrollers are used in a wide variety of commercial products such as refrigerators, cellular telephones, and automotive antilock braking systems. Microcontrollers are data processing devices having both a central processing unit (CPU) for executing conventional microprocessor software instructions, and peripheral devices. Here the term "peripheral" is used generally and means all devices peripheral to the CPU, including both input/output devices and memory devices. The CPU and peripherals typically are interconnected via a common internal bus. Because both CPU and peripheral functions are implemented on a single integrated circuit, microcontrollers are useful for cost-sensitive control functions. Some microcontrollers, known as single-chip microcontrollers, have all program memory on-chip and do not connect to an external bus to access off-chip memory. Thus, pin count may be reduced to a minimum, reducing cost even further. These single-chip microcontrollers are useful for the most cost-sensitive applications.

Reliability is important for commercial products using single-chip microcontrollers, and requires the integrated circuit manufacturer to sufficiently test the microcontroller's circuitry before shipping the device. Thus it is necessary to test both the CPU and the on-chip peripherals. While it is relatively easy to test the CPU by passing instruction operation codes (opcodes) to the CPU through available input/output (I/O) pins, testing memory-mapped peripherals in known single-chip microcontrollers is more problematic. The CPU accesses memory-mapped peripherals by performing read and write cycles to one or more selected addresses. To perform a functional test, the CPU must fetch both an opcode and an address from the I/O pins and then execute these instructions, for each memory-mapped register which must be initialized. To determine the test result, the CPU must fetch both an opcode and an address of a memory-mapped register which indicates the result, execute the instruction, fetch another opcode and address of the I/O pins, and then execute the instruction. Thus, most test time is consumed in overhead cycles to the CPU. Even if the peripheral includes scan testing circuitry, it is still necessary for the CPU to write the test data to the peripheral's memory-mapped scan circuitry and to read the output, thus requiring many overhead cycles for opcode fetching and accessing the I/O pins. What is needed, then, is a more cost-effective way to reliably test a single-chip microcontroller.

SUMMARY OF THE INVENTION

Accordingly, the present invention provides, in one form, a single-chip microcontroller with efficient peripheral testability. The single-chip microcontroller includes an address bus, a data bus, a data processor, at least one memory-mapped peripheral, an input/output port, and a test port. The data processor and the at least one memory-mapped peripheral are each coupled to the address and data buses. The input/output port selectively couples at least one external signal line to the data bus. The test port has an input coupled to the at least one external signal line, and outputs coupled to the address and data buses. The test port selectively provides test data conducted on the at least one external signal line to the address and data buses in response to at least one control signal. The result is that the test port provides signals to the address and data buses to emulate the data processor accessing the at least one memory-mapped peripheral in order to test the at least one memory-mapped peripheral more efficiently.

These and other features and advantages will be more clearly understood from the following detailed description taken in conjunction with the accompanying drawings.

DETAILED DESCRIPTION OF A PREFERRED EMBODIMENT

Figure 1:
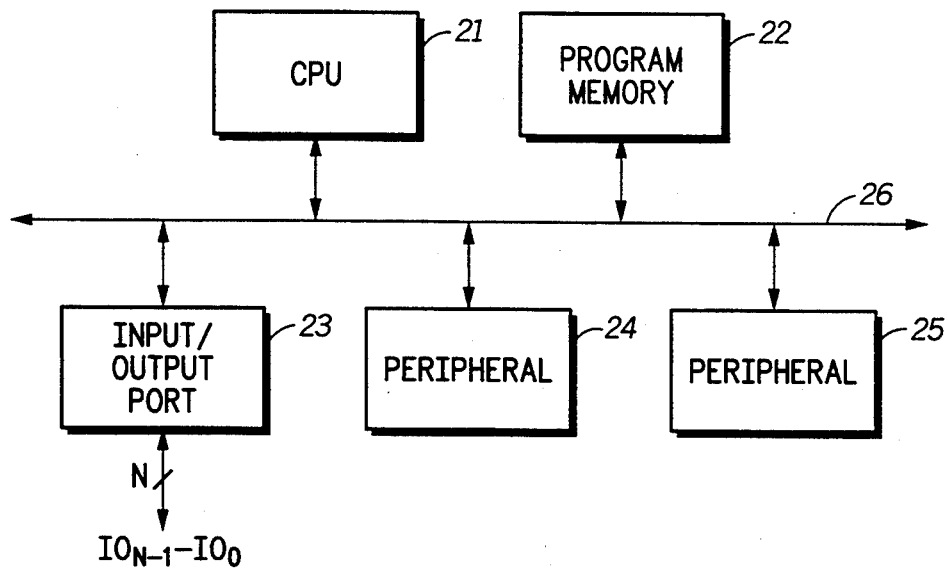
FIG. 1 illustrates in block diagram form a single-chip microcontroller known in the prior art.

FIG. 1 illustrates in block diagram form a single-chip microcontroller 20 known in the prior art. Microcontroller 20 is a single integrated circuit including a central processing unit (CPU) 21, a program memory 22, an input/output port 23, and additional peripherals 24 and 25 commonly connected via an internal bus 26. CPU 21 executes instructions stored in program memory 22 and periodically accesses input/output port 23 and peripherals 24 and 25. Program memory 22 is a nonvolatile memory such as a read only memory (ROM), erasable-programmable ROM (EPROM), electrically erasable programmable ROM (EEPROM), or the like. Input/output port 23 is an N-bit, programmable, bidirectional interface to external components such as sensors, displays, light-emitting diodes (LEDs), and the like and conducts an arbitrary number "N" of external signals labelled "$IO_{N-1}$-$IO_0$". As used here, "external" refers to signals that are conducted off-chip. Peripherals 24 and 25 each perform one of a known variety of peripheral functions including but not limited to random access memory (RAM), timers, counters, communication channels, and the like.

While it is possible for CPU 21 to output special control signals to access each of peripherals 22-25, peripherals 22-25 are conventionally memory-mapped. That is, each of peripherals 22-25 is accessed when an address portion of internal bus 26 equals one or more predefined values. Thus, each of peripherals 22-25 includes a decoder and registers or memory locations which are assigned a unique address. Internal bus 26, while being shown as a single bus, conducts address, data, and control signals.

The peripherals of microcontroller 20 are conventionally tested through instructions executed by CPU 21. CPU 21 fetches the appropriate sequence of instructions from input/output port 23. The execution of this instruction sequence causes CPU 21 to write data to and subsequently read data from the peripheral being tested. The type of testing actually performed within each peripheral varies. For example, one peripheral may include one or more scan chains, with the test data programming the scan chain. Another peripheral may have one or more registers to control its operation, with the test data initiating a functional test. Despite the type of testing each peripheral performs, testing of each peripheral requires CPU 21 to execute a sequence of instructions to retrieve the test instruction operation codes (opcodes) and memory-mapped addresses from input/output port 23. Using CPU 21 to execute instructions to fetch test data and to perform instructions, however, is very inefficient, because most cycles are related to programming CPU 21 rather than to testing the peripheral. The result is excessive test time, which increases cost. A better apparatus to test these peripherals is desirable.

Figure 2:
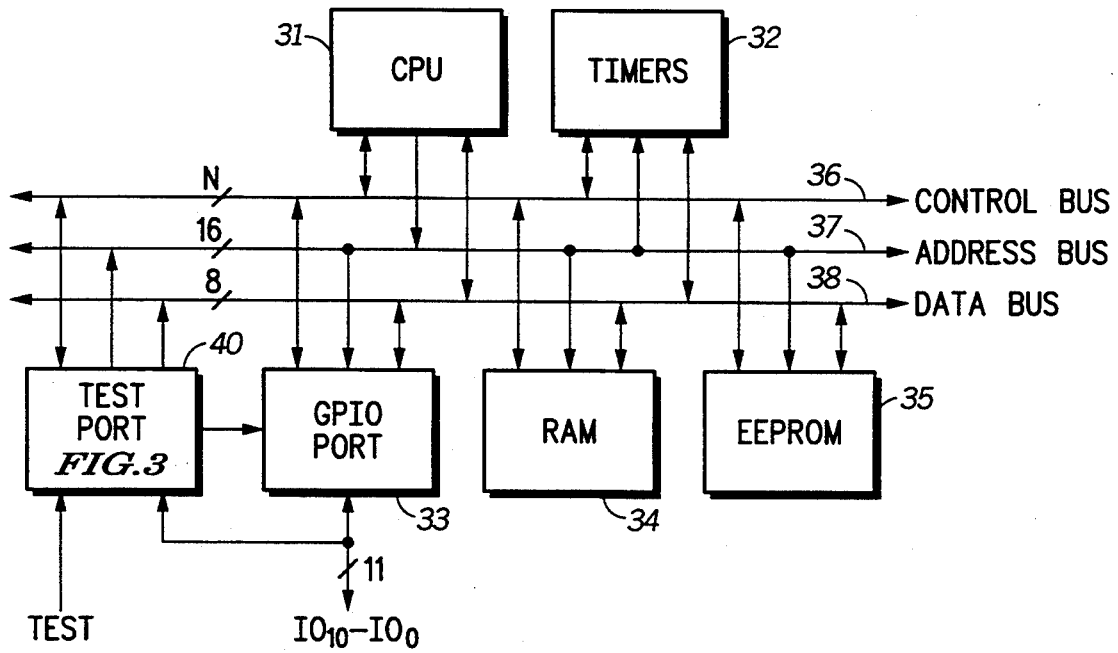
FIG. 2 illustrates in block diagram form a single-chip microcontroller according to the present invention.

FIG. 2 illustrates in block diagram form a single-chip microcontroller 30 according to the present invention. Microcontroller 30 includes a data processor functioning as a CPU 31, a timers block 32, a general-purpose input/output (GPIO) port 33, a RAM 34, and an EEPROM 35, each connected together via a common internal control bus 36, a common internal address bus 37, and a common internal data bus 38. Microcontroller 30 also includes a test port 40 for testing microcontroller 30.

CPU 31 provides address output signals to address bus 37, which is a 16-bit bus conducting address signals designated "ADDRESS". CPU 31 has an 8-bit data path bidirectionally connected to data bus 38, which conducts signals designated "DATA". CPU 31 also has a bidirectional connection to a control bus which includes an output for providing a read-write control signal labelled "IR/W", and inputs for receiving clock signals designated "IACLK" and "IBCLK". These control signals are given by way of example only and additional control signals will almost always be present. Thus, the width of control bus 36 is designated as "N", where again N is arbitrary and varies according to the specific application.

In general each memory-mapped peripheral 32-35 has an input connected to address bus 37 and a bidirectional connection to control bus 36. The type of connection to data bus 38 depends on the peripheral's function. Timers block 32 counts preprogrammed numbers of a clock input signal (not shown), and maintains a count in a readable register (not shown). GPIO port 33 provides an interface between CPU 31 and external devices such as sensors, displays, LEDs, and the like through eleven signal lines labelled "$IO_{10}$-$IO_0$". RAM 34 includes sequential memory locations which are both readable and writable. EEPROM 35 is for storing a program such as a user program, and may be rewritten after an erase cycle. Thus, each of the illustrated peripherals has a bidirectional connection to data bus 38. However, some peripherals such as serial output ports may only have an input connected to data bus 38, and other peripherals such as ROMs may only have an output connected to data bus 38.

Test port 40 has an input for receiving an external control signal labelled "TEST", an input connected to signal lines $IO_{10}$-$IO_0$, a control output connected to GPIO port 33, a bidirectional connection to control bus 36 and outputs connected to address bus 37 and data bus 38. Test port 40 differs from peripherals 32-35 in that it includes an output connected to address bus 37. External data provided to test port 40 may form part of the address provided to address bus 37. Microcontroller 30 differs from known single-chip microcontrollers because CPU 31 is not required to test memory-mapped peripherals 32-35. Instead, test port 40 receives a test pattern from an external source such as a very large scale integration (VLSI) tester through signals $IO_7$-$IO_0$ shared with GPIO port 33. Test port 40 provides the test pattern directly to address bus 37 and data bus 38, thereby allowing the test pattern to test peripherals 32-35 directly rather than having to load instructions into CPU 31. Thus, test time is greatly reduced.

Figure 3:
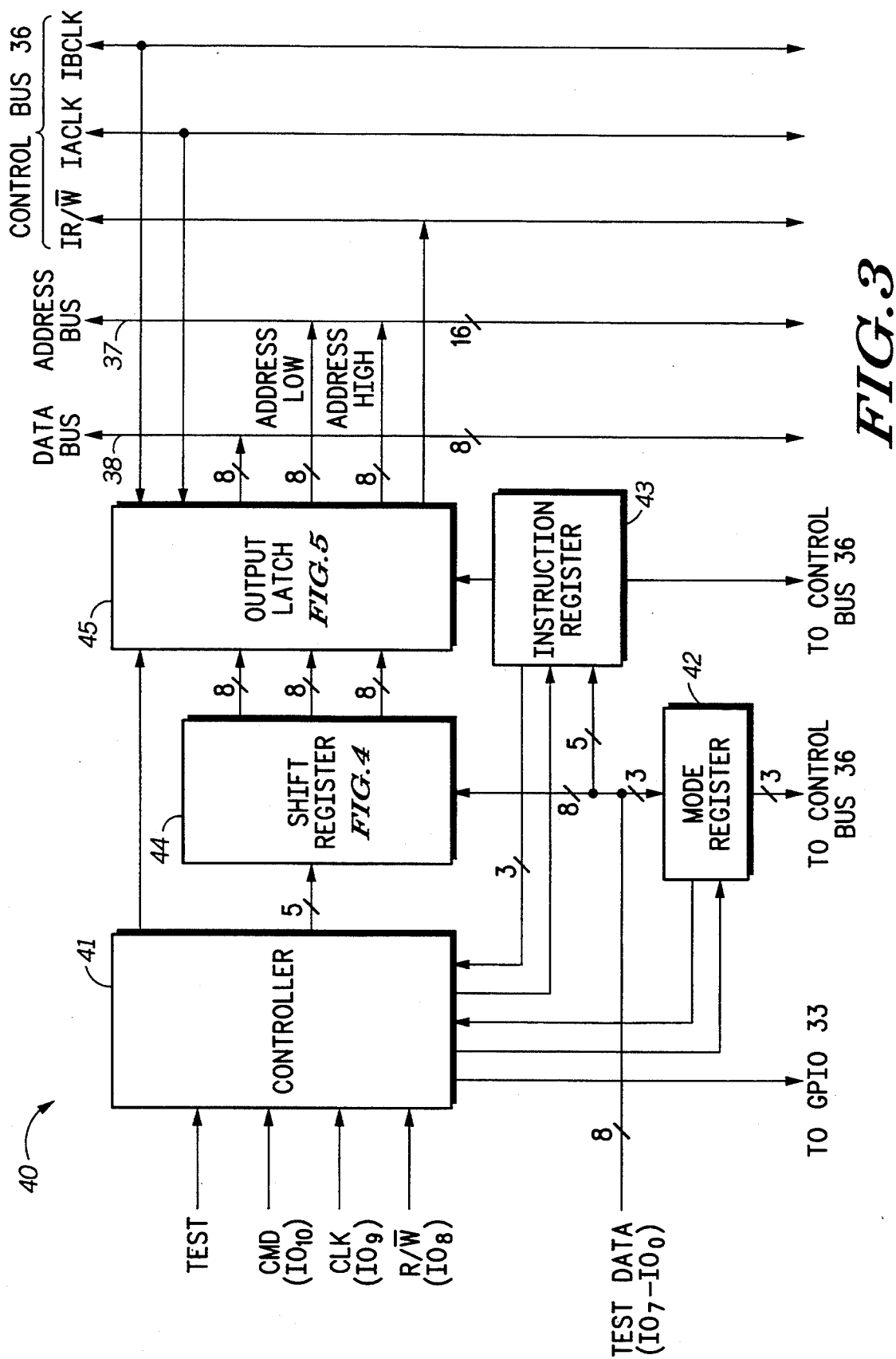
FIG. 3 illustrates a generalized block diagram of the test port of FIG. 2 useful in understanding the present invention.

Test port 40 is understood by reference to FIG. 3, which illustrates a generalized block diagram thereof useful in understanding the present invention. Test port 40 has four control signal inputs for receiving signal TEST and control signals labelled "CMD", "R/$\overline{W}$", and "CLK". Signals CMD, R/$\overline{W}$, and CLK are received from signal lines $IO_{10}$, $IO_9$, and $IO_8$, respectively, shared with GPIO port 33 of FIG. 2. Test port 40 also has an eight-bit input data path for receiving signals labelled "TEST DATA" from signal lines $IO_7$-$IO_0$ shared with GPIO port 33. Note that each of signals $IO_{10}$-$IO_0$ is connected to a corresponding bonding pad (not shown) of single-chip microcontroller 30. Test port 40 has connections to the internal buses of microcontroller 30 which are illustrated in greater detail in FIG. 3. Test port 40 has two 8-bit outputs connected to address bus 37, one labelled "ADDRESS HIGH" providing an eight more-significant bits of ADDRESS, and another labelled "ADDRESS LOW" providing an eight less-significant bits of ADDRESS. FIG. 3 illustrates three pertinent signals of control bus 36: clock signals IACLK and IBCLK which are inputs to test port 40, and signal IR/$\overline{W}$ which is provided as an output by test port 40. Test port 40 also provides a control signal output to GPIO port 33 for causing data conducted on data bus 38 to be provided externally on signal lines $IO_7$-$IO_0$ during a test mode read cycle, and provides five signals to control bus 36.

Test port 40 includes generally a controller 41, a MODE REGISTER 42, an INSTRUCTION REGISTER 43, a shift register 44, and an output latch 45. Controller 41 receives each of input signals TEST, CMD, CLK, and R/$\overline{W}$, has outputs connected to MODE REGISTER 42, INSTRUCTION REGISTER 43, shift register 44, and output latch 45, and receives one input from MODE REGISTER 42 and three inputs from INSTRUCTION REGISTER 43. The operation of controller 41 will be described in greater detail below.

Signal TEST is an active-high control input signal connected to a bonding pad (not shown), which allows data to be written to MODE REGISTER 42. In response to signal TEST being active, controller 41 activates the control signal line provided to MODE REGISTER 42 to cause MODE REGISTER 42 to latch the three least significant bits of TEST DATA on a falling edge of signal CLK. To enter test mode, signal TEST is activated at a logic high, and MODE REGISTER 42 is configured for test mode by setting appropriate bits as illustrated in TABLE I below. Subsequently, signal TEST should be deactivated at a logic low to prevent reprogramming MODE REGISTER 42.

MODE REGISTER 42 is a three-bit register which includes user-programmable bits for controlling the operation of test port 40. These bits are described in TABLE I below:

TABLE I

| NAME | MEANING | DESCRIPTION |
|---|---|---|
| PDIS | Peripheral Disable | When set, all peripherals are disabled by forcing corresponding peripheral select signals to go inactive. CPU 31 remains active. This bit is set only during testing of CPU 31, and allows CPU 31 to drive address bus 37 without corrupting any memory-mapped resister. |
| DATM | Direct Access Test Mode | When set, this bit allows external devices to have direct control of address bus 37 and data bus 38. When this bit is set, CPU 31 is disabled and cannot drive the internal buses. Instead, test port 40 is enabled and controls address bus 37 and data bus 38 and signal IR/$\overline{W}$ of control bus 36. This bit is provided as the control input to controller 41 from test port 40. |
| ITM | Enable Internal Test Mode | When set, internal test mode is enabled, and each peripheral allows access to its test circuitry from the internal buses. This bit does not itself affect the operation of CPU 31. |

Note that all three bits of MODE REGISTER 42, PDIS, DATM, and ITM, are provided to control bus 36. Signal CMD is an active-high control input signal connected to the bonding pad shared with signal IO$_{10}$. In response to signal CMD being active, controller 41 activates the control signal line provided to INSTRUCTION REGISTER 43 to cause INTSTRUCTION REGISTER 43 to latch five bits of TEST DATA, namely bits 0–3 and 7. Note that for both MODE REGISTER 42 and INSTRUCTION REGISTER 43, the actual bit assignments may vary from embodiment to embodiment. INSTRUCTION REGISTER 43 is a five-bit register which controls how incoming test data is used. The function of these bits are described in TABLE II and III below:

TABLE II

| NAME | MEANING | DESCRIPTION |
|---|---|---|
| CFE | Clock Freeze Enable | This bit may be used by any peripheral. When set, it indicates that the peripheral should ignore IACLK and IBCLK except for the purpose of shifting data into and out of that peripheral. |
| RSM2–RSM0 | Register Scan Mode | These bits configure the scan chain within test port 40, as described more particularly in TABLE III below. Bits RSM2–RSM0 are provided as the control inputs to controller 41 from INSTRUCTION REGISTER 43. |
| IRW | Internal Read/Write | This bit controls the logic state of the IR/$\overline{W}$ signal line during direct access test mode. A binary one indicates a read cycle, whereas a binary zero indicates a write cycle. This bit is provided to control bus 36. |

TABLE III

| RSM2 | RSM1 | RSM0 | DESCRIPTION |
|---|---|---|---|
| 0 | 0 | 0 | No operation. |
| 0 | 0 | 1 | This mode only places eight DATA bits into the scan chain. This is useful after ADDRESS HIGH and ADDRESS LOW have been loaded and data is to be sent to a memory-mapped parallel scan chain. |
| 0 | 1 | 0 | This mode places only ADDRESS LOW into the scan chain. This mode is useful when reading a block of memory such as RAM 34 or EEPROM 35, since it is not always necessary to reload ADDRESS HIGH. |
| 0 | 1 | 1 | This mode places both DATA and ADDRESS LOW into the scan chain. This mode is useful when writing data to a block of memory such as RAM 34, since it is not always necessary to reload ADDRESS HIGH. |
| 1 | 0 | 0 | This mode places only ADDRESS HIGH and ADDRESS LOW into the scan chain. |
| 1 | 0 | 1 | This mode places only ADDRESS HIGH and DATA into the scan chain. |
| 1 | 1 | 0 | This mode takes DATA out of the scan chain, leaving only ADDRESS HIGH and ADDRESS LOW. This mode is useful if data is constant but the entire address changes. |
| 1 | 1 | 1 | This mode enables the entire scan chain, including DATA, ADDRESS HIGH, and ADDRESS LOW. |

Signal CLK is an input signal shared with signal line IO$_9$ used to synchronously input data into either MODE REGISTER 42, INSTRUCTION REGISTER 43, or shift register 44. The TEST and CMD pins determine the destination of TEST DATA as illustrated in TABLE IV below:

TABLE IV

| TEST | CMD | DESTINATION |
|---|---|---|
| 1 | 0 | MODE REGISTER 42 |
| 0 | 1 | INSTRUCTION REGISTER 43 |
| 0 | 0 | SHIFT REGISTER 44 |

During a write test mode cycle (control signal R/$\overline{W}$ inactive at a logic low) to shift register 44, controller 41 provides corresponding signals to shift register 44 to latch TEST DATA on the falling edge of signal CLK. During a read cycle (control signal R/$\overline{W}$ active at a logic high), GPIO port 33 outputs data via signal lines IO$_7$–IO$_0$ asynchronously. Controller 41 activates the output signal provided to GPIO port 33 so that signal lines IO$_7$–IO$_0$ contain valid data. Note that the edge of signal CLK used to input TEST DATA or output data via signal lines $IO_7$-$IO_0$ may vary from embodiment to embodiment, and additional control signals may be used either alone or with signal TEST to enable other test modes.

Figure 4:
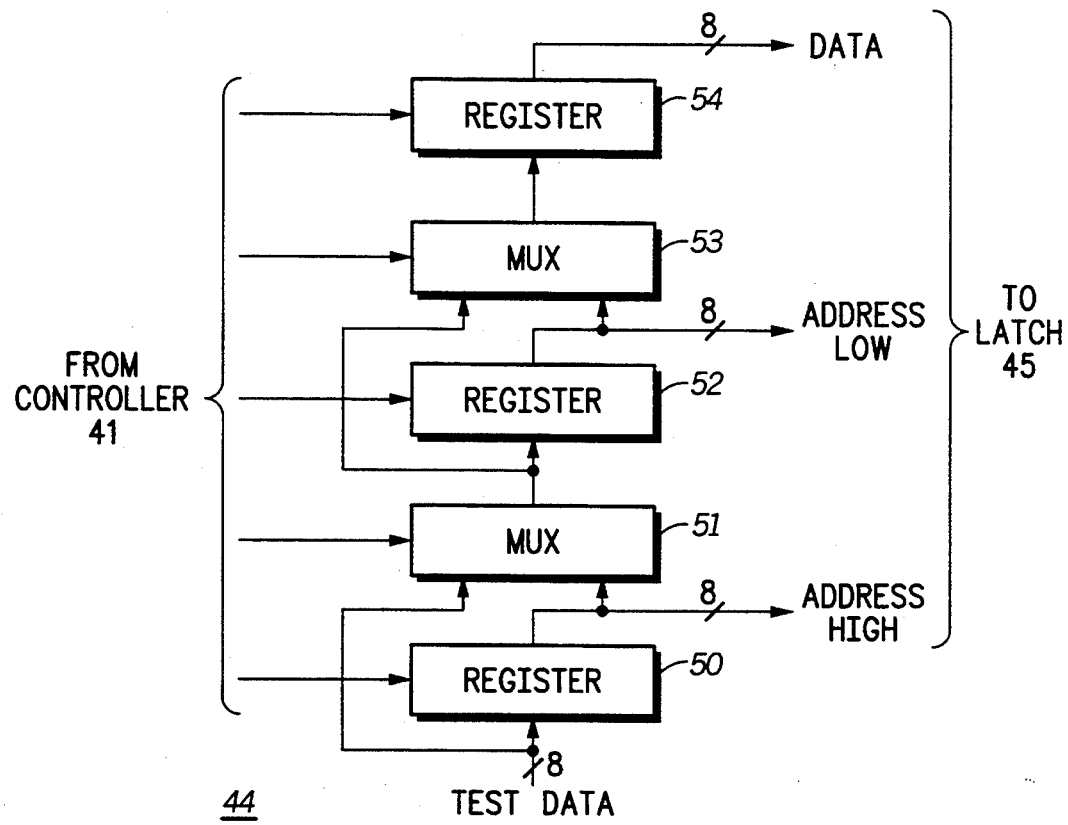
FIG. 4 illustrates a detailed block diagram of the shift register of FIG. 3.

FIG. 4 illustrates a detailed block diagram of shift register 44 of FIG. 3. Shift register 44 includes a register 50, a multiplexer labelled "MUX" 51, a register 52, a MUX 53, and a register 54. Register 50 has an 8-bit input terminal for receiving signals TEST DATA, a control input terminal connected to controller 41, and an 8-bit output terminal for providing the ADDRESS HIGH field to output latch 45. MUX 51 has a first 8-bit input terminal for receiving signals TEST DATA, a second 8-bit input terminal connected to the output terminal of register 50, a control input terminal connected to controller 41, and an 8-bit output terminal. Register 52 has an 8-bit input terminal connected to the output terminal of MUX 51, a control input terminal connected to controller 41, and an 8-bit output terminal for providing the ADDRESS LOW field to output latch 45. MUX 53 has a first 8-bit input terminal connected to the output terminal of MUX 51, a second 8-bit input terminal connected to the output terminal of register 52, a control input terminal connected to controller 41, and an 8-bit output terminal. Register 54 has an 8-bit input terminal connected to the output terminal of MUX 53, a control input terminal connected to controller 41, and an 8-bit output terminal for providing signals DATA to output latch 45.

Shift register 44, in conjunction with controller 41 and output latch 45, additionally improves test efficiency by selectively updating only required 8-bit portions of ADDRESS and DATA. For example, if during one cycle test data were to be written to one of memory mapped peripherals 32-35 of FIG. 2, and then during a subsequent test cycle different data were to be written to the same memory-mapped location, then shift register 44 allows only the eight bits of data to be rewritten before another cycle is performed on the internal bus. This is accomplished because controller 41 disables the latching of data into registers 50 and 52, enables the writing of data into register 54, causes MUXes 51 and 53 to select the first inputs thereof. Thus, controller 41 causes TEST DATA to update the contents of register 54 but not affect the contents of registers 50 and 52. Thus, the next internal cycle may be performed after only one external cycle.

Figure 5:
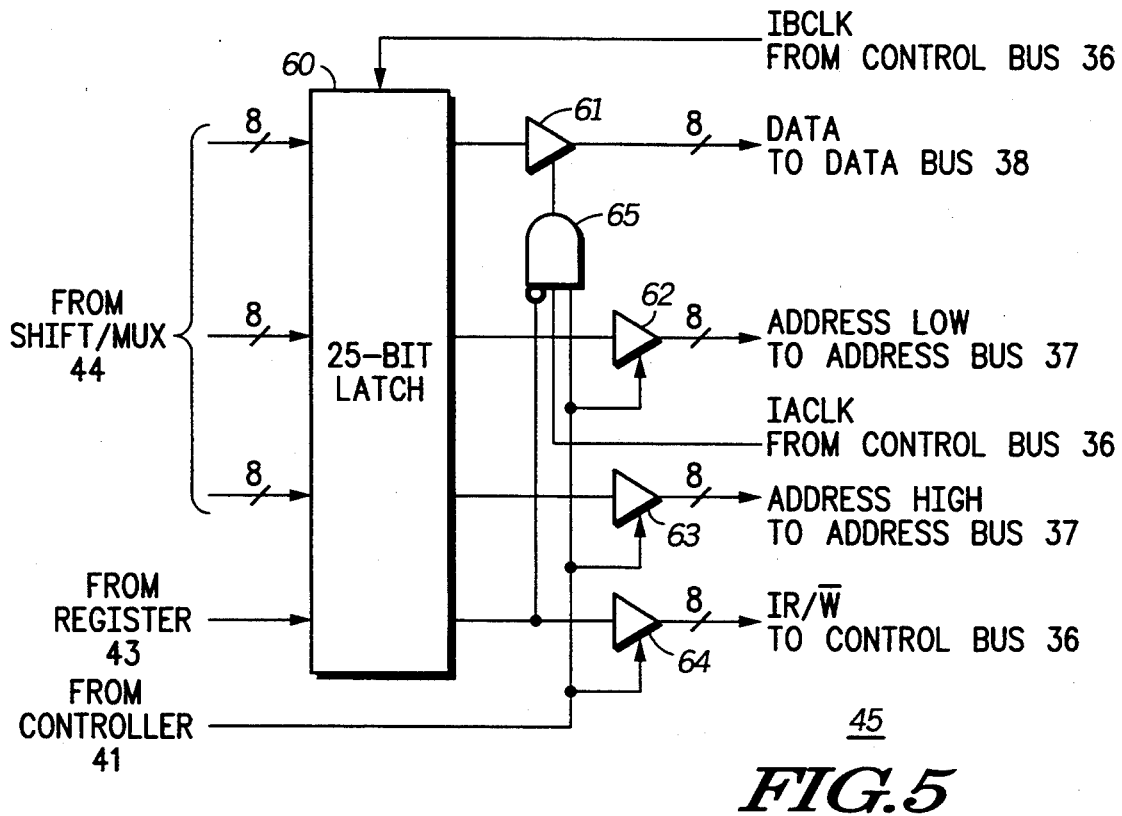
FIG. 5 illustrates a detailed block and logic diagram of the latch of FIG. 3.

FIG. 5 illustrates a detailed block and logic diagram of output latch 45 of FIG. 3. Output latch 45 includes a 25-bit latch 60 and control circuitry for the operation thereof including three-state buffers 61-64, and an AND gate 65. Latch 60 has three 8-bit input terminals connected to the output terminals of registers 50, 52, and 54 of shift register 44 of FIG. 4, a one-bit input terminal connected to INSTRUCTION REGISTER 43 of FIG. 3, output terminals corresponding to the input terminals, and a control input terminal for receiving signal IBCLK from control bus 36. Buffer 61 has an 8-bit input terminal connected to the DATA output terminal of latch 60, a control input terminal, and an 8-bit output terminal for providing DATA to data bus 38. Buffer 62 has an 8-bit input terminal connected to the ADDRESS LOW output terminal of latch 60, a control input terminal connected to controller 41, and an 8-bit output terminal for providing ADDRESS LOW to address bus 37. Buffer 63 has an 8-bit input terminal connected to the ADDRESS HIGH output terminal of latch 60, a control input terminal connected to controller 41, and an 8-bit output terminal for providing ADDRESS HIGH to address bus 37. Buffer 64 has an input terminal connected to the R/$\overline{W}$ output terminal of latch 60, a control input terminal connected to controller 41, and an output terminal for providing signal IR/$\overline{W}$ to control bus 36. AND gate 65 has a complementary input terminal connected to the R/$\overline{W}$ output terminal of latch 60, a first true input terminal connected to control bus 36 for receiving signal IACLK therefrom, a second true input terminal connected to controller 41, and an output terminal connected to the control input terminal of buffer 61.

Output latch 45 allows each of the ADDRESS HIGH, ADDRESS LOW, and DATA signal groups to be independently updated between test cycles. The new values for each of these fields propagate through output latch 45 while IBCLK is at a logic high, but are latched on the falling edge of IBCLK. The control signal provided from controller 41 is only active in test mode. Thus, only during direct access test mode (referred to simply as "test mode") does test port 40 drive the ADDRESS, DATA, and IR/$\overline{W}$ signals. Additional qualification is placed on the DATA signals. During a read cycle, signal IR/$\overline{W}$ is active at a logic high, and thus the output of AND gate 65 is a logic low, disabling buffer 61. During a write cycle in test mode, signal R/$\overline{W}$ is inactive at a logic low, and controller 41 drives the second true input of AND gate 65 to a logic high. Buffer 61 provides valid data in synchronism with the rising edge of signal IACLK, which is provided to the first true input terminal of AND gate 65. The relative timing of input test signals and resulting bus cycles may be better understood with reference to FIGS. 6 and 7.

Figure 6:
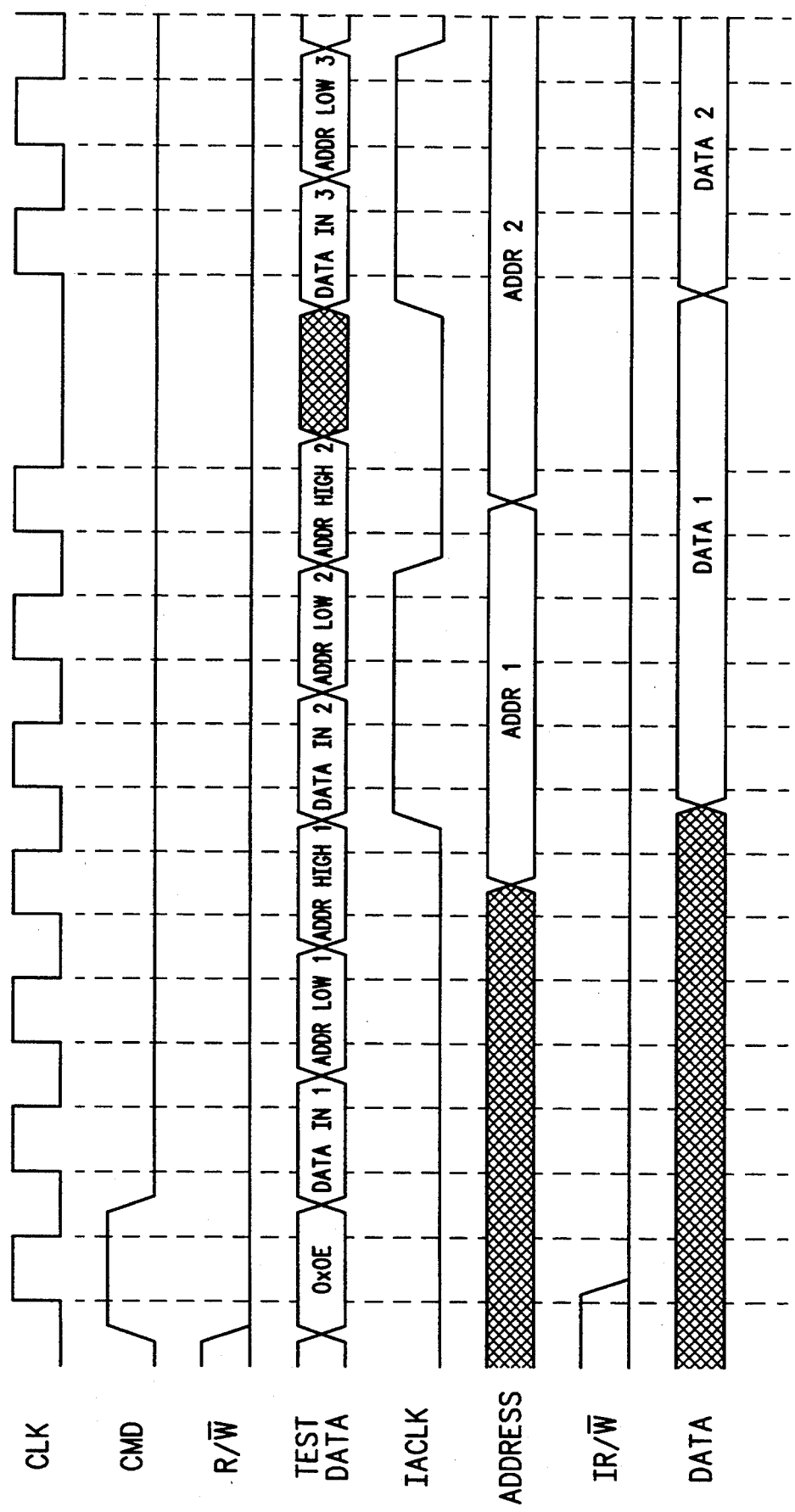
FIG. 6 illustrates a timing diagram of two test mode write cycles.

FIG. 6 illustrates a timing diagram of two test mode write cycles. FIG. 6 illustrates test input signals CLK, CMD, and R/$\overline{W}$, TEST DATA, control signals IACLK and IR/$\overline{W}$, address signals ADDRESS, and data signals DATA. FIG. 6 assumes that MODE REGISTER 42 was previously initialized for test mode. During a first cycle, signal CMD is activated at a logic high and a data pattern of $0E (where the symbol "$" represents hexadecimal notation) is written to INSTRUCTION REGISTER 43, indicating through the RSM2-0 bits that DATA, ADDRESS LOW, and ADDRESS HIGH will all be updated, and through the IRW bit that a test mode write cycle will follow. During the next three cycles, specific values labelled "DATA IN 1", "ADDR LOW 1", and "ADDR HIGH 1" are received in sequence via the TEST DATA signal lines. After ADDR HIGH 1 is received, an internal write cycle using these values is executed synchronously with IACLK. This internal write cycle may, for example, program a peripheral's memory-mapped register or provide a data value to the peripheral's scan chain. FIG. 6 also illustrates a subsequent write cycle using three new values received as TEST DATA labelled "DATA IN 2", "ADDR LOW 2", and "ADDR HIGH 2".

Figure 7:
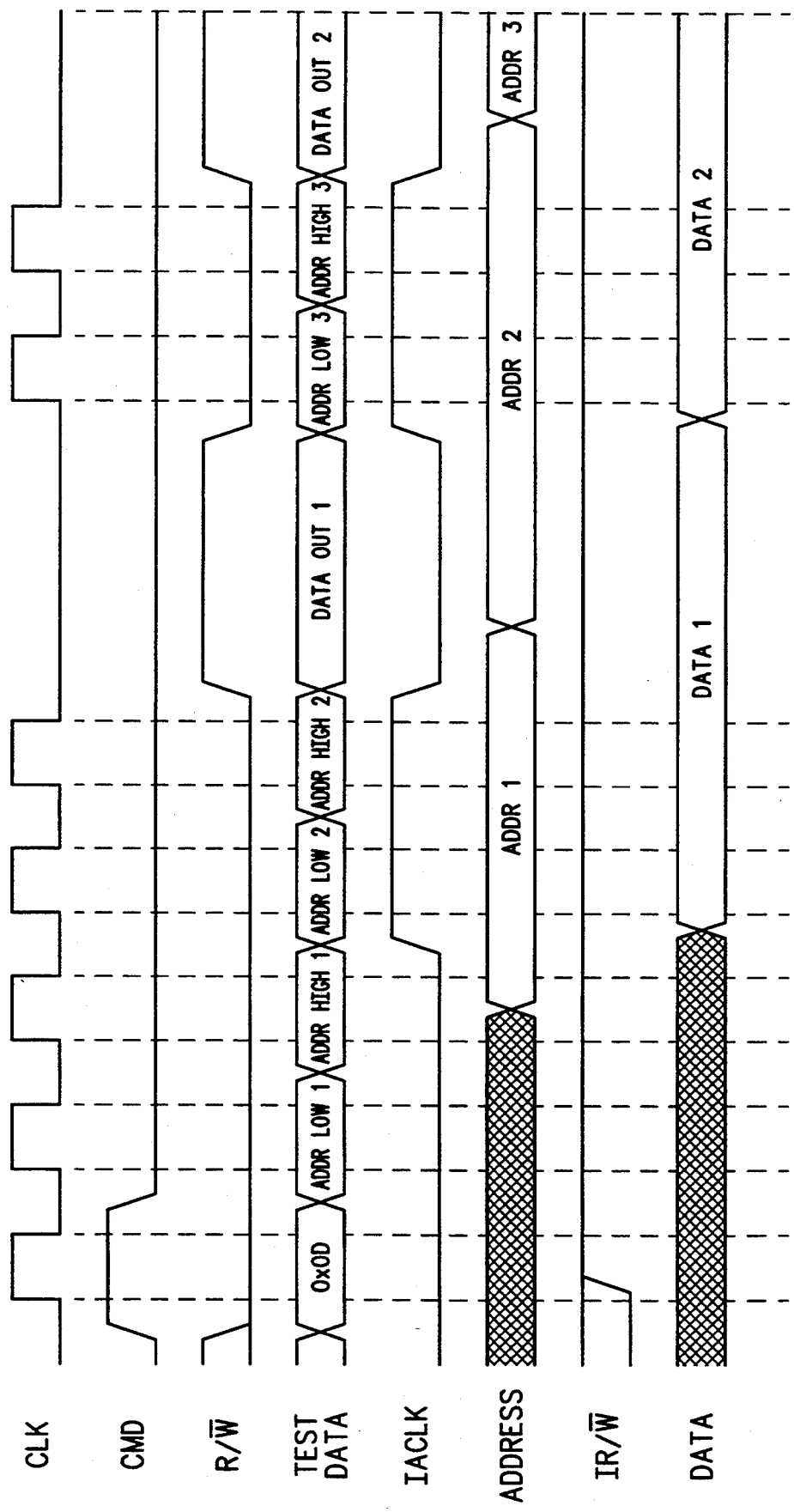
FIG. 7 illustrates a timing diagram of two test mode read cycles.

FIG. 7 illustrates a timing diagram of two test mode read cycles. FIG. 7 includes the same signals previously illustrated in FIG. 6. As in FIG. 6, FIG. 7 assumes that MODE REGISTER 42 was previously initialized for test mode. During a first cycle, signal CMD is activated at a logic high and a data pattern of $0D is written to INSTRUCTION REGISTER 43, indicating through the RSM2-0 bits that only ADDRESS LOW and ADDRESS HIGH will be updated, and through the IRW bit that a test mode read cycle will follow. During the next two cycles, specific values labelled "ADDR LOW 1" and "ADDR HIGH 1" are received in sequence via the TEST DATA signal lines. After ADDR HIGH 1 is received, an internal read cycle using these values is executed syncrhonously with IACLK. An accessed peripheral provides a data value to data bus 38 labelled "DATA 1", which is subsequently provided externally as a value labelled "DATA OUT 1" on the $IO_7$-$IO_0$ signal lines. This internal bus cycle may, for example, read a peripheral's memory-mapped register which indicates a result of a functional test, or read a data value from the peripheral's scan chain. FIG. 7 also illustrates a subsequent read cycle using two new values received as TEST DATA labelled "ADDR LOW 2" and "ADDR HIGH 2". A data value provided to data bus 38 labelled "DATA 2" is subsequently provided externally as a value labelled "DATA OUT 2" on the $IO_7$-$IO_0$ signal lines. Note that ADDR LOW 2 and ADDR HIGH 2 are loaded into shift register 44 prior to GPIO port 33 receiving DATA 1 from data bus 38. This allows DATA 1 sufficient time to become valid before GPIO port 33 places it on the $IO_7$-$IO_0$ lines as DATA OUT 1.

While the invention has been described in the context of a preferred embodiment, it will be apparent to those skilled in the art that the present invention may be modified in numerous ways and may assume many embodiments other than those specifically set out and described above. For example, the clock edges used to indicate valid data and the internal address and data bus sizes will vary from embodiment to embodiment. Also, the number of available pins for input test data will vary and need only be a minimum of one. However, the percentage reduction in test time will increase with the number of pins available for receiving test data. The order of data, address low, and address high in shift register 44 may also vary. Also the test port may be used to test a subset of the on-chip peripherals; such a test scheme would be useful, for example, if the other peripherals included serial scan chain circuitry accessible through separate input/output pins. Accordingly, it is intended by the appended claims to cover all modifications of the invention which fall within the true spirit and scope of the invention.

I claim:

1. A single-chip microcontroller with efficient peripheral testability, comprising:
   an address bus;
   a data bus;
   a data processor coupled to said address and data buses;
   at least one memory-mapped peripheral coupled to said address and data buses;
   an input/output port for selectively coupling at least one external signal line to said data bus; and
   a test port having an input coupled to said at least one external signal line, and outputs coupled to said address and data buses, said test port selectively providing test data conducted on said at least one external signal line to said address and data buses in response to at least one control signal;
   said test port comprising:
      a shift register having an input coupled to said at least one external signal line for receiving said test data, a control input for receiving a first control signal, and an output, said shift register converting said test data into selected address and data fields;
      an output latch having a data input coupled to said output of said shift register, a first control input coupled to a control bus for receiving a clock signal, a second control input for receiving a second control signal, and a data output coupled to said address and data buses, said output latch coupling said selected address and data fields to corresponding portions of said address and data buses, respectively, in response to said second control signal and synchronously with said clock signal; and
      a controller coupled to said control input of said shift register and to said second control input of said output latch, for receiving a plurality of external test control input signals, and for providing said first and second control signals in response thereto, said shift register comprising:
         a first register having an input for receiving said test data, a control input coupled to said controller, and an output coupled via said output latch to a first predetermined one of said address and data buses;
         a first multiplexer having a first input for receiving said test data, a second input coupled to said output of said first register, a control input coupled to said controller, and an output; and
         a second register having an input coupled to said output of said first multiplexer, a control input coupled to said controller, and an output coupled via said output latch to a second predetermined one of said address and data buses,
      whereby said test port provides signals to said address and data buses to emulate said data processor accessing said at least one memory-mapped peripheral in order to test said at least one memory-mapped peripheral more efficiently.

2. The single-chip microcontroller of claim 1 wherein said at least one memory-mapped peripheral comprises a program memory coupled to said address and data bus, for storing a plurality of instructions for execution by said data processor.

3. The single-chip microcontroller of claim 1 wherein said test port comprises means for preventing said data processor from accessing said address and data buses during a test mode of the single-chip microcontroller.

4. The single-chip microcontroller of claim 1 wherein said at least one control signal is conducted on said control bus.

5. The single-chip microcontroller of claim 4 wherein said at least one control signal conducted on said control bus comprises a clock signal.

6. The single-chip microcontroller of claim 1 wherein said shaft register further comprises:
   a second multiplexer having a first input coupled to said output of said first multiplexer, a second input coupled to said output of said second register, a control input coupled to said controller, and an output; and
   a third register having an input coupled to said output of said second multiplexer, a control input coupled to said controller, and an output coupled via said output latch to a third predetermined one of said address and data buses.

7. The single-chip microcontroller of claim 6 wherein said first predetermined one of said address and data buses comprises said address bus and said first register is coupled to a more-significant portion thereof, wherein said second predetermined one of said address and data buses comprises said address bus and said second register is coupled to a less-significant portion thereof, and said third predetermined one of said address and data buses comprises said data bus.

8. The single-chip microcontroller of claim 1 wherein said output latch drives said data output thereof in response to said test data when said second control signal is in a first logic state, and keeps said data output thereof in a high-impedance state when said second control signal is in a second logic state.

9. A single-chip microcontroller with efficient peripheral testability, comprising:

control, address, data buses;

a data processor coupled to said control, address, and data buses;

a plurality of memory-mapped peripherals each coupled to said data bus and having inputs coupled to said control and address buses; and a test port coupled to said control bus and having outputs coupled to said address and data buses;

said test port comprising:

a shift register having an input for receiving test data, a control input for receiving a first control signal, and an output, said shift register converting said test data into selected address and data fields;

an output latch having a data input coupled to said output of said shift register, a first control input coupled to said control bus for receiving a clock signal, a second control input for receiving a second control signal, and a data output coupled to said address and data buses, said output latch coupling said selected address and data fields to corresponding portions of said address and data buses, respectively, in response to said second control signal and synchronously with said clock signal; and a controller coupled to said control input of said shift register and to said second control input of said output latch, for receiving a plurality of external test control input signals, and for providing said first and second control signals in response thereto;

said shift register comprising:

a first register having an input for receiving said test data, a control input coupled to said controller, and an output coupled via said output latch to a first predetermined one of said address and data buses;

a first multiplexer having a first input for receiving said test data, a second input coupled to said output of said first register, a control input coupled to said controller, and an output; and a second register having an input coupled to said output of said first multiplexer, a control input coupled to said controller, and an out put coupled via said output latch to a second predetermined one of said address and data buses, whereby said test port provides signals to said address bus and to said data bus to emulate said data processor accessing at least one of said plurality of memory-mapped peripherals.

10. The single-chip microcontroller of claim 9 wherein said shift register further comprises:

a second multiplexer having a first input coupled to said output of said first multiplexer, a second input coupled to said output of said second register, a control input coupled to said controller, and an output; and a third register having an input coupled to said output of said second multiplexer, a control input coupled to said controller, and an output coupled via said output latch to a third predetermined one of said address and data buses.

11. The single-chip microcontroller of claim 10 wherein said first predetermined one of said address and data buses comprises said address bus and said first register is coupled to a more-significant portion thereof, wherein said second predetermined one of said address and data buses comprises said address bus and said second register is coupled to a less-significant portion thereof, and said third predetermined one of said address and data buses comprises said data bus.

12. The single-chip microcontroller of claim 9 wherein said output latch drives said data output thereof in response to corresponding data input signals when said second control signal is in a first logic state, and keeps said data output thereof in a high-impedance state when said second control signal is in a second logic state.

13. The single-chip microcontroller of claim 9 wherein said plurality of memory-mapped peripherals comprises:

a program memory for storing a program of said data processor; and an input/output port having an input coupled to a plurality of external input/output signal lines;

said test port receiving said test data via at least one of said plurality of external input/output signal lines during a test mode of the single-chip microcontroller.

* * * * *